No. 683,111. Patented Sept. 24, 1901.
J. FISHER & W. WEINSHENKER.
GLASS WASHER.
(Application filed June 24, 1901.)
(No Model.)

Witnesses:
Chas. E. Gorton.
A. Gustafson

Inventors
Joseph Fisher
William Weinshenker
By Chas. C. Tillman
Atty.

UNITED STATES PATENT OFFICE.

JOSEPH FISHER AND WILLIAM WEINSHENKER, OF CHICAGO, ILLINOIS.

GLASS-WASHER.

SPECIFICATION forming part of Letters Patent No. 683,111, dated September 24, 1901.

Application filed June 24, 1901. Serial No. 65,774. (No model.)

*To all whom it may concern:*

Be it known that we, JOSEPH FISHER and WILLIAM WEINSHENKER, citizens of the United States, residing at Chicago, in the county of Cook and State of Illinois, have invented certain new and useful Improvements in Glass-Washers, of which the following is a specification.

This invention relates to improvements in devices to be employed for washing drinking glasses or tumblers, and is more especially intended for washing the glasses used at soda-water fountains and at saloon-bars; and it consists in certain peculiarities of the construction, novel arrangement, and operation of the parts thereof, as will be hereinafter more fully set forth and specifically claimed.

It is the general custom at soda-water fountains and in saloons to use a basin or vessel containing water in which the glasses after being used are placed and washed. This method is objectionable, for the reason that the water soon becomes impure and unclean by reason of the variety of liquids and syrups which the glasses have held, a portion of which clings to them when placed in the vessel. This method is also objectionable from a sanitary point of view on account of the promiscuous crowds which drink from the glasses.

It is therefore the object of our invention to provide a glass-washing apparatus which shall be simple and inexpensive in construction, strong, durable, and effective in operation, and which by reason of its peculiar construction will automatically wash the glasses internally and externally in ever-changing water, thus avoiding the objections above mentioned.

In order to enable others skilled in the art to which our invention pertains to make and use the same, we will now proceed to describe it, referring to the accompanying drawings, in which—

Figure 1:
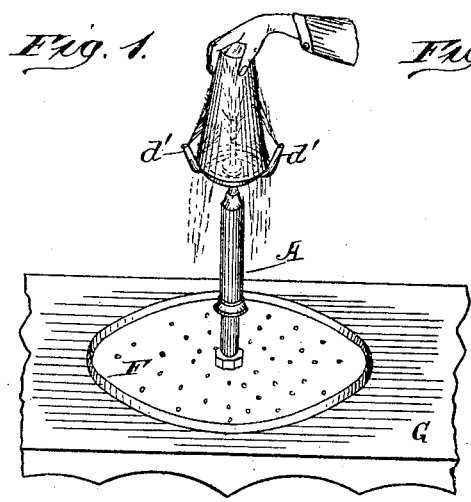
Figure 3:
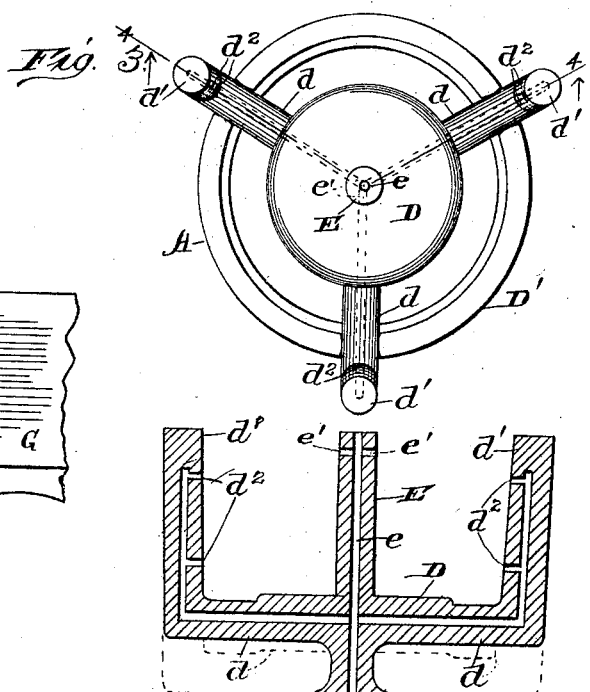
Figure 2:
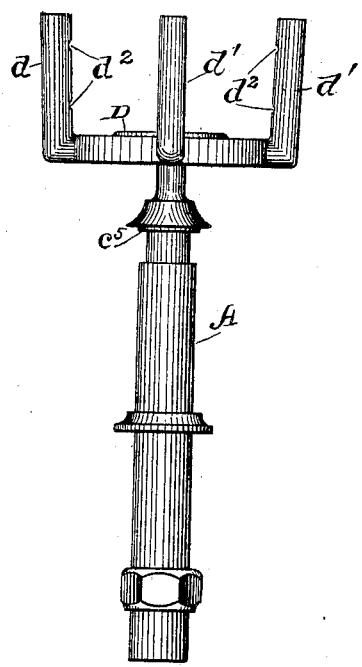
Figure 4:
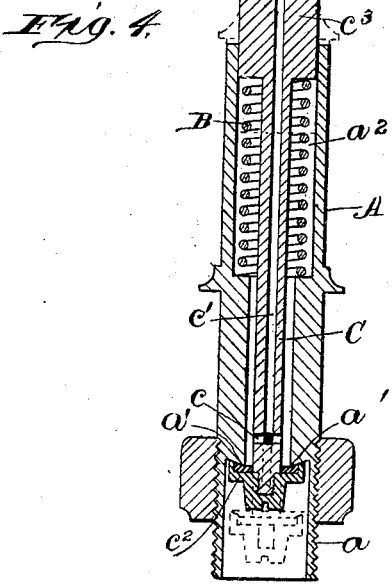

Figure 1 is a perspective view of a glass-washer embodying our invention, showing a glass thereon in the act of being washed. Fig. 2 is a view in side elevation of the washer. Fig. 3 is a plan view thereof, and Fig. 4 is an enlarged sectional view taken on line 4 4 of Fig. 3 looking in the direction indicated by the arrows.

Similar letters refer to like parts throughout the different views of the drawings.

A represents a tube which has its lower portion provided with external screw-threads $a$ to engage a pipe (not shown) leading to a supply of water. The lower portion of the tube A is formed with a valve-seat $a'$ and the upper portion thereof is provided with an enlarged cavity $a^2$ for the reception and operation of a coiled spring B, which surrounds and actuates the hollow stem C, which is provided in its lower portion with transverse openings $c$, communicating with the vertical opening $c'$ in said stem and with the hollow of the tube A, which surrounds it. The lower end of the stem C is provided with a valve $c^2$, which is normally held against the seat $a'$ in the tube A by means of the spring B, as will be readily understood by reference to Fig. 4 of the drawings. The upper portion of the stem C is provided with an enlargement $c^3$, which fits snugly the enlarged opening $a^2$ of the tube C and against which the upper end of the spring B will rest. The upper end of the stem C is provided with a horizontal plate or disk D, from which extend horizontally a number of hollow arms $d$, which are provided at their outer portions with upward and hollow extensions $d'$, having openings $d^2$ on their inner portions. The arms $d$ are united by means of a circular or ringed piece D' and the upper ends of the extensions $d'$ are closed, as is clearly shown in Fig. 3 of the drawings. The center of the disk or plate D is provided with an upright E, which has a channel $e$ communicating with the opening $c'$ of the stem C, and which channel extends through the upper end of said upright, which is also provided near its upper end with transverse openings $e'$ for the passage of water. The enlarged portion $c^3$ of the stem C is provided with an annular flange $c^4$ and a gasket $c^5$ of leather or other suitable material to contact with the upper end of the tube A when the glass-support, which comprises the stem C, the disk D, arms $d$, and ring D', is depressed. Around the lower portion of the tube A may be placed a tray F, having perforations or openings through which the water may pass and on which tray the glasses may be placed to drain after they have been washed. In Fig. 1 of the drawings we have shown the washer equipped with a tray of this description and secured on a support G, which may be a counter, table, or other suitable support.

The operation is simple and as follows: A glass may be inverted and placed over the central upright E, so that its rim will rest on the arms $d$, as shown in Fig. 1 of the drawings, when by pressing downwardly on the glass the stem C will be depressed, thus removing the valve $c$ from its seat and permitting the water to pass into and through the openings $c$, channel $c'$, and hollows or channels of the arms and extensions $d$ and $d'$ and out through the openings $d^2$ against the outer surface of the glass. At the same time the water will be forced through the channel $e$ and out through the openings $e'$ of the central extension or upright E to the inner portion of the glass, thus thoroughly washing the same. After the glass has been thus cleansed it may be placed in an inverted position on the tray F to drain. It is apparent that as soon as the pressure is removed from the glass-supporter the spring B will raise the stem C and cause its valve $c^2$ to close the opening in the tube A, and thus shut off the flow of water.

Having thus fully described our invention, what we claim as new, and desire to secure by Letters Patent, is—

In a glass-washer, the combination with a tube, having its cavity enlarged at its lower portion to form a valve-casing and at its upper portion to receive a spring, of a hollow stem located in said tube and having its upper portion enlarged to form a shoulder against which one end of said spring will rest, a valve located on the lower end of the stem, the said stem having openings in its lower portion but above the valve and also provided with an annular shoulder on its upper portion to impinge the upper end of the tube, a spring located in the upper portion of the said tube, and surrounding a part of the stem to actuate the same, a series of arms having upward extensions provided with openings in their inner surfaces and connected to the upper portion of the stem, a central extension or upright having a vertical opening in its upper end and transverse openings near said end, said arms and extensions having channels and openings communicating with the hollow of the stem for the passage of water, and a ring uniting said arms at their outer portions, substantially as described.

JOSEPH FISHER.
WILLIAM $\times$ WEINSHENKER.
his mark

Witnesses:
CHAS. C. TILLMAN,
ETTIE WEINSHENKER.